(12) United States Patent
Biris et al.

(10) Patent No.: US 11,233,400 B2
(45) Date of Patent: Jan. 25, 2022

(54) BALANCING REACTIVE CURRENT BETWEEN A DFIG STATOR AND A GRID-SIDE INVERTER

(71) Applicant: VESTAS WIND SYSTEMS A/S, Aarhus N (DK)

(72) Inventors: Ciprian Biris, Hinnerup (DK); Uffe C. Merrild, Bryrup (DK); Leif Svinth Christensen, Thorsø (DK); Gert Karmisholt Andersen, Hovedgård (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 538 days.

(21) Appl. No.: 16/062,888

(22) PCT Filed: May 16, 2017

(86) PCT No.: PCT/DK2017/050157
§ 371 (c)(1),
(2) Date: Jun. 15, 2018

(87) PCT Pub. No.: WO2017/202429
PCT Pub. Date: Nov. 30, 2017

(65) Prior Publication Data
US 2020/0274360 A1    Aug. 27, 2020

(30) Foreign Application Priority Data

May 25, 2016    (DK) .............................. PA201670353

(51) Int. Cl.
*H02J 3/18*    (2006.01)
*F03D 7/02*    (2006.01)
(Continued)

(52) U.S. Cl.
CPC .......... *H02J 3/1892* (2013.01); *F03D 7/0284* (2013.01); *F03D 9/255* (2017.02);
(Continued)

(58) Field of Classification Search
CPC ........... H02J 3/1892; H02J 3/18; F03D 9/255; F03D 7/0284; G05B 15/02; H02K 7/183;
(Continued)

(56) References Cited

U.S. PATENT DOCUMENTS 9,318,988 B2    4/2016  Larsen et al.
2012/0139353 A1    6/2012  Olea Oregi et al.
(Continued)

FOREIGN PATENT DOCUMENTS

CN    102017383 A    4/2011
CN    102214931 A    10/2011
(Continued)

OTHER PUBLICATIONS

Intellectual Property India First Examination Report for Application No. 201817041791 dated Dec. 14, 2020.
(Continued)

*Primary Examiner* — Joseph Ortega
(74) *Attorney, Agent, or Firm* — Patterson + Sheridan, LLP

(57) ABSTRACT

Aspects of the present invention relate to a method for controlling an amount of reactive current provided from a wind turbine generator to a power grid during an abnormal power grid event, said wind turbine generator comprising a doubly-fed induction generator having a rotor and a stator, and a power converter coupling the rotor to the power grid, the power converter comprising a grid-side inverter, wherein the method comprises the step of balancing the reactive current provided to the power grid between a reactive stator current and a reactive grid-side inverter current, wherein the
(Continued)

reactive grid-side inverter current is controlled in accordance with a reactive current capacity of a grid breaker receiving the reactive current provided by the grid-side inverter. Aspects of the present invention also relate to a wind turbine generator being capable of performing the method.

17 Claims, 3 Drawing Sheets

(51) Int. Cl.
  *F03D 9/25* (2016.01)
  *G05B 15/02* (2006.01)
  *H02K 7/18* (2006.01)
  *H02P 9/00* (2006.01)

(52) U.S. Cl.
  CPC ............. *G05B 15/02* (2013.01); *H02K 7/183* (2013.01); *H02P 9/007* (2013.01); *H02P 2207/073* (2013.01)

(58) Field of Classification Search
  CPC .... H02P 9/007; H02P 2207/073; Y02E 10/72; Y02E 10/76; Y02E 40/30; F05B 2270/1071
  See application file for complete search history.

(56) References Cited

U.S. PATENT DOCUMENTS

| | | | |
|---|---|---|---|
| 2015/0311696 A1* | 10/2015 | Zhu | H02H 7/06 361/21 |
| 2015/0365031 A1 | 12/2015 | Wessels | |
| 2016/0032896 A1 | 2/2016 | Barton et al. | |

FOREIGN PATENT DOCUMENTS

| | | |
|---|---|---|
| CN | 102324747 A | 1/2012 |
| CN | 103259269 A | 8/2013 |
| CN | 104604068 A | 5/2015 |
| EP | 2017936 A1 | 1/2009 |
| EP | 2955808 A1 | 12/2015 |
| WO | WO-2009103505 A2 * | 8/2009 ............. H02P 9/007 |
| WO | 2017202429 A1 | 11/2017 |

OTHER PUBLICATIONS

Danish Patent and Trademark Office First Technical Examination for Application No. PA 2016 70353 dated Dec. 12, 2016.
PCT International Search Report for Application No. PCT/DK2017/050157 dated May 16, 2017.
PCT Written Opinion of the International Searching Authority for Application No. PCT/DK2017/050157 May 16, 2017.
Chinese Office Action for Application No. 2017801030819.4 dated May 31, 2021.

* cited by examiner

BALANCING REACTIVE CURRENT BETWEEN A DFIG STATOR AND A GRID-SIDE INVERTER

FIELD OF THE INVENTION

Aspects of the present invention relate to a method and a wind turbine generator for balancing reactive power between a stator of a doubly-fed induction generator and a grid-side inverter during an abnormal power grid event.

BACKGROUND OF THE INVENTION

During an abnormal power grid event, it may be necessary to increase the amount of reactive current delivered to the power grid. In case the power producing unit involves a wind turbine generator applying a doubly-fed induction generator (DFIG), the majority of reactive current is delivered to the power grid via the stator of the electrical generator.

DESCRIPTION OF ASPECTS OF THE INVENTION

In known arrangements involving DFIGs the increased amount of reactive current is delivered via the stator. This may be disadvantageous in that the increased amount of reactive current may heat the stator to undesired temperatures with the risk of shortening the lifetime of the DFIG. Thus, there is a need for a method and an arrangement for lowering the reactive stator current during an abnormal power grid event, while at the same, delivering a required amount of reactive current to the power grid.

It may be seen as an object of embodiments of the present invention to provide a method for reducing a stator current of a DFIG through an abnormal power grid event.

The above-mentioned objects are complied with by providing, in a first aspect, a method for controlling an amount of reactive current provided from a wind turbine generator to a power grid during an abnormal power grid event, said wind turbine generator comprising a doubly-fed induction generator having a rotor and a stator, and a power converter coupling the rotor to the power grid, the power converter comprising a grid-side inverter, wherein the method comprises the step of balancing the reactive current provided to the power grid between a reactive stator current and a reactive grid-side inverter current, wherein the reactive grid-side inverter current is controlled in accordance with an overload current capability of a grid breaker receiving the reactive current provided by the grid-side inverter.

The reactive grid-side inverter current may be controlled in accordance with an overload reactive current capability of the grid breaker. In the present disclosure the abnormal power grid event may involve a voltage change on the power grid, such as in connection with a low-voltage ride through (LVRT) event, an under-voltage ride through (UVRT) event, an over-voltage ride through (OVRT) event or a high-voltage ride through (HVRT) event, where the wind turbine generator remains connected to the power grid in order to support the power grid during the abnormal power grid event.

An abnormal power grid event may involve a voltage drop below a predetermined grid voltage value. In case of an LVRT or UVRT this predetermined value may in principle correspond to every value between 0 and 100% of the nominal grid voltage. In case of a UVRT or HVRT the predetermined value may in principle correspond to any value above the nominal grid voltage. The voltage change may be measured using one or more software controlled voltage sensors connected to one or more phases.

The duration of an abnormal power grid event may typically vary from a fraction of a second to several minutes depending on the type abnormality. Before and after an abnormal power grid event the wind turbine generator may be operated in a power mode, whereas during the abnormal power grid events, such as an LVRT, a UVRT, an OVRT or an HVRT event, the wind turbine generator is operated according to embodiments of the method according to the present invention where reactive current to be provided to the power grid is balanced between a stator current of a DFIG generator and a reactive grid-side inverter current. In order not to overload the grid breaker connected to the grid-side inverter the reactive grid-side inverter current is controlled in accordance with an overload reactive current capability of the grid breaker. The overload current capability, or the overload reactive current capability, of the grid breaker may define the conditions at which the grid breaker may be operated above its rated current level. The grid-side inverter current may be controlled in a manner so that the grid breaker does not trip.

The balancing of the reactive current between the stator of the DFIG and the grid-side inverter is advantageous in that the reactive stator current may be kept below a predetermined upper stator current limit in order to avoid for example unnecessary heating of the DFIG. The reactive stator current may be kept below the predetermined upper stator current limit by keeping a reactive rotor current below a predetermined upper rotor current limit.

The amount of reactive current to be provided to the power grid equals the sum of the reactive stator current and the reactive grid-side inverter current.

In order to keep the reactive stator current below the predetermined upper stator current limit the reactive grid-side inverter current may be controlled to exceed a rated current capacity of the grid breaker in at least part of a predetermined time period. The predetermined time period may be from less than a second to several minutes or even longer. The predetermined time period may equal the duration of the abnormal power grid event.

The reactive grid-side inverter current may exceed, during at least part of the predetermined time period, the rated current capacity of the grid breaker by at least 20%, such as at least 30%, such as at least 40%, such as at least 50%, such as at least 60%, such as at least 80%, such as at least 100%. A rated current capacity of a typical grid breaker may be for example 200 A. For comparison a rated current level of a DFIG may be for example 1600 A. It should be noted however, that the rated current levels of the grid breaker and the DFIG may be different from the levels mentioned here.

A grid breaker may be capable of handling more current in the initial phase of an abnormal power grid event compared to the closing phase of an abnormal power grid event. Thus, if a high overload current level is kept static during a complete abnormal power grid event the grid breaker may trip due to for example overheating. To avoid tripping of the grid breaker the reactive grid-side inverter current may be controlled to decrease during the predetermined time period. The reactive grid-side inverter current may, during at least part of the predetermined time period, be controlled to decrease in a predetermined manner, such as in a substantial linear manner.

In a second aspect, the present invention relates to a wind turbine generator arranged to deliver an amount of reactive current to a power grid during an abnormal power grid event, said wind turbine generator comprising 1) a doubly-fed induction generator having a rotor and a stator,
2) a power converter coupling the rotor to the power grid, said power converter comprising a grid-side inverter, and
3) a controller for balancing a reactive current to be provided to the power grid between a reactive stator current and a reactive grid-side inverter current, and controlling the reactive grid-side inverter current in accordance with an overload current capability of a grid breaker receiving the reactive current provided by the grid-side inverter.

The balancing of the reactive current between the stator of the DFIG and the grid-side inverter is advantageous in that unnecessary heating of the DFIG may be avoided since the controller may be arranged to keep the reactive stator current below a predetermined upper stator current limit. The reactive stator current may be kept below the predetermined upper stator current limit by keeping a reactive rotor current below a predetermined upper rotor current limit.

The controller may additionally be arranged to keep the reactive grid-side inverter current above a rated current capacity of the grid breaker in at least part of a predetermined time period. The predetermined time period may from less than a second to several minutes or even longer. The predetermined time period may equal the duration of the abnormal power grid event.

The reactive grid-side inverter current may exceed, during at least part of the predetermined time period, the rated current capacity of the grid breaker by at least 20%, such as at least 30%, such as at least 40%, such as at least 50%, such as at least 60%, such as at least 80%, such as at least 100%. A rated current capacity of a typical grid breaker may be for example 200 A. For comparison a rated current level of a DFIG may be for example 1600 A. It should be noted however, that the rated current levels of the grid breaker and the DFIG may be different from the levels mentioned here.

A grid breaker may be capable of handling more current in the initial phase of an abnormal power grid event compared to the closing phase of an abnormal power grid event. Thus, if a high overload current level is kept static during a complete abnormal power grid event the grid breaker may trip due to for example overheating. To avoid tripping of the grid breaker the reactive grid-side inverter current may be controlled, using the controller, to decrease to during the predetermined time period. The reactive grid-side inverter current may, during at least part of the predetermined time period, be controlled to decrease in a predetermined manner, such as in a substantial linear manner.

BRIEF DESCRIPTION OF THE DRAWINGS

The present invention will now be described in further details by way of embodiments and with reference to the accompanying figures, wherein.

Figure 1:
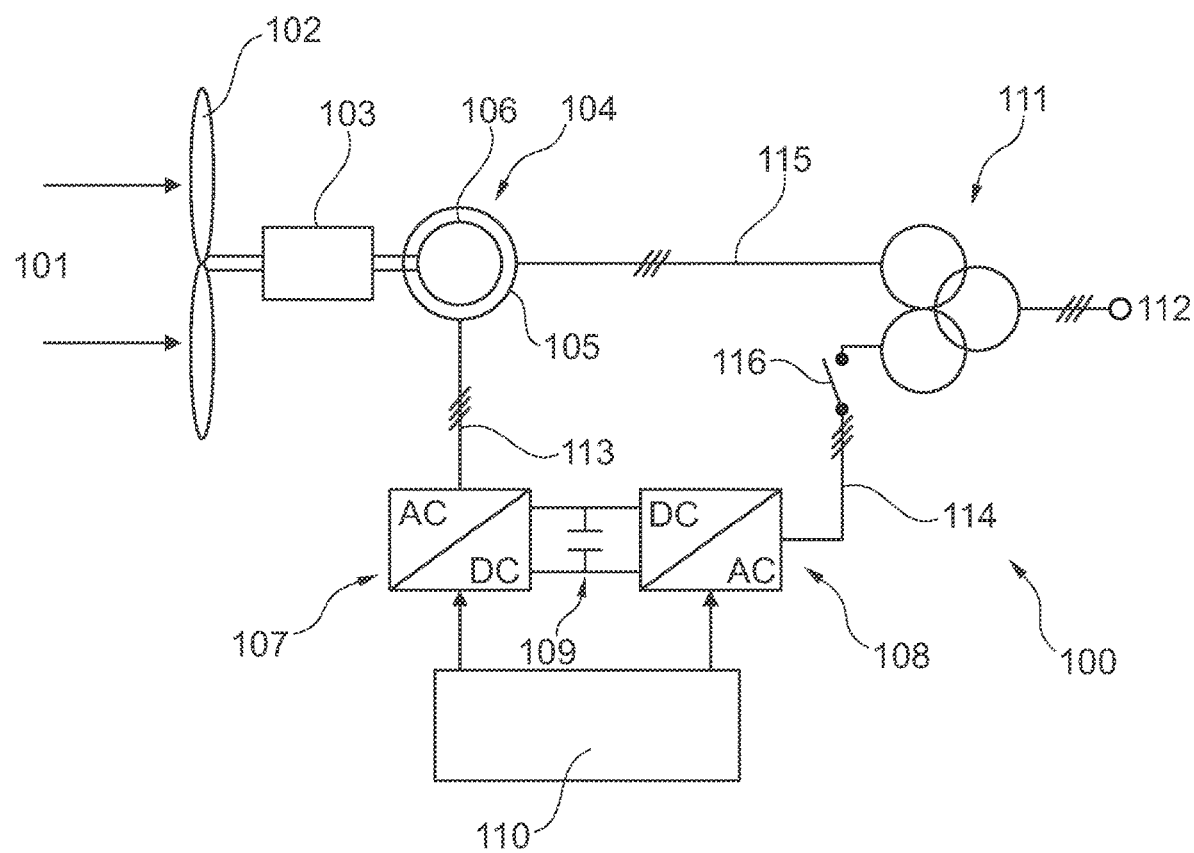
FIG. 1 shows a wind turbine generator applying a doubly-fed induction generator.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF EMBODIMENTS

An aspect of the present invention relates to a method for operating a wind turbine generator using a DFIG during an abnormal power grid event, such as during a power grid voltage drop including an LVRT event, a UVRT event, an OVRT event or an HVRT event. When an abnormal power grid event is detected the generated reactive power is balanced between the stator of the DFIG and a grid-side inverter while taking into consideration an overload current capability of a grid breaker operatively connected to the grid-side inverter. The overload current capability of the grid breaker may be an overload reactive current capability. The overload current capability, or the overload reactive current capability, of the grid breaker may define the conditions at which the grid breaker may be operated above its rated current level.

Referring now to FIG. 1 a wind turbine generator 100 involving a DFIG 104 is depicted. As seen in FIG. 1 the rotor 106 of the DFIG 104 is coupled to a set of rotor blades 102 via an optional gearbox 103. The rotor blades 102 rotate in response to incoming wind power 101.

The DFIG 104 is adapted to deliver power to the power grid 112 via an optional grid transformer 111 via two three phase branches 113, 114 and 115. In the latter of the two three phase branches 115 power is delivered from the stator 105 of the DFIG 104 to the optional grid transformer 111. The other of the two three phase branches 113, 114 further comprises a frequency power converter involving a rotor-side AC/DC inverter 107 and a grid-side DC/AC inverter 108 being separated by an intermediate DC link 109. The rotor-side AC/DC inverter 107 and the grid-side DC/AC inverter 108 is controlled by a power controller 110. Power may flow in both directions in the three phase branches 113, 114.

The three phase branch 114 comprises a three phase grid breaker 116 for disconnecting the grid-side DC/AC inverter from the optional grid transformer 111. The grid breaker 116 may comprise controllable switches inserted in each of the three phases. The technical specifications of these controllable switches set the rated current level of the grid breaker 116.

Similar to other power electronic components the grid breaker 116 may be temporary overloaded compared to its rated current level. Embodiments of the present invention take advantage of this temporal overload capability of the grid breaker 116 in that the reactive power delivered via the DFIG stator may then be reduced.

As stated above the temporal overload capability of the grid breaker 116 facilitates that the grid breaker 116 can be operated above its rated current level in a predetermined period of time without tripping and/or without being damage. Thus, by operating the grid breaker 16 above its rated current level an excess of reactive current can be provided to the power grid 112 through the grid breaker 116 while the reactive current provided by the stator 105 can be reduced accordingly. The temporal overload current through the grid breaker 116 typically decreases in a controlled manner during the abnormal power grid event. For example, the decreasing overload current may follow a linear dependency. However, other decreasing dependencies may also be applicable.

During normal operation the wind turbine generator 100 is typically operated in a so-called power mode where the amount of active and reactive power to be delivered to the power grid 112 is set by respective active and reactive power references.

As addressed above the abnormal power grid event may involve an LVRT event or a UVRT event where the power grid voltage for some reason drops to a voltage level being anywhere between 0 and 100% of the nominal power grid voltage. In case of an OVRT event or an HVRT event the power grid voltage may in principle be anywhere above the nominal power grid voltage.

When an abnormal power grid event has been detected the power mode is disabled. In order to support the power grid with reactive power during the abnormal power grid event the wind turbine generator remains connected to the power grid.

Figure 2:
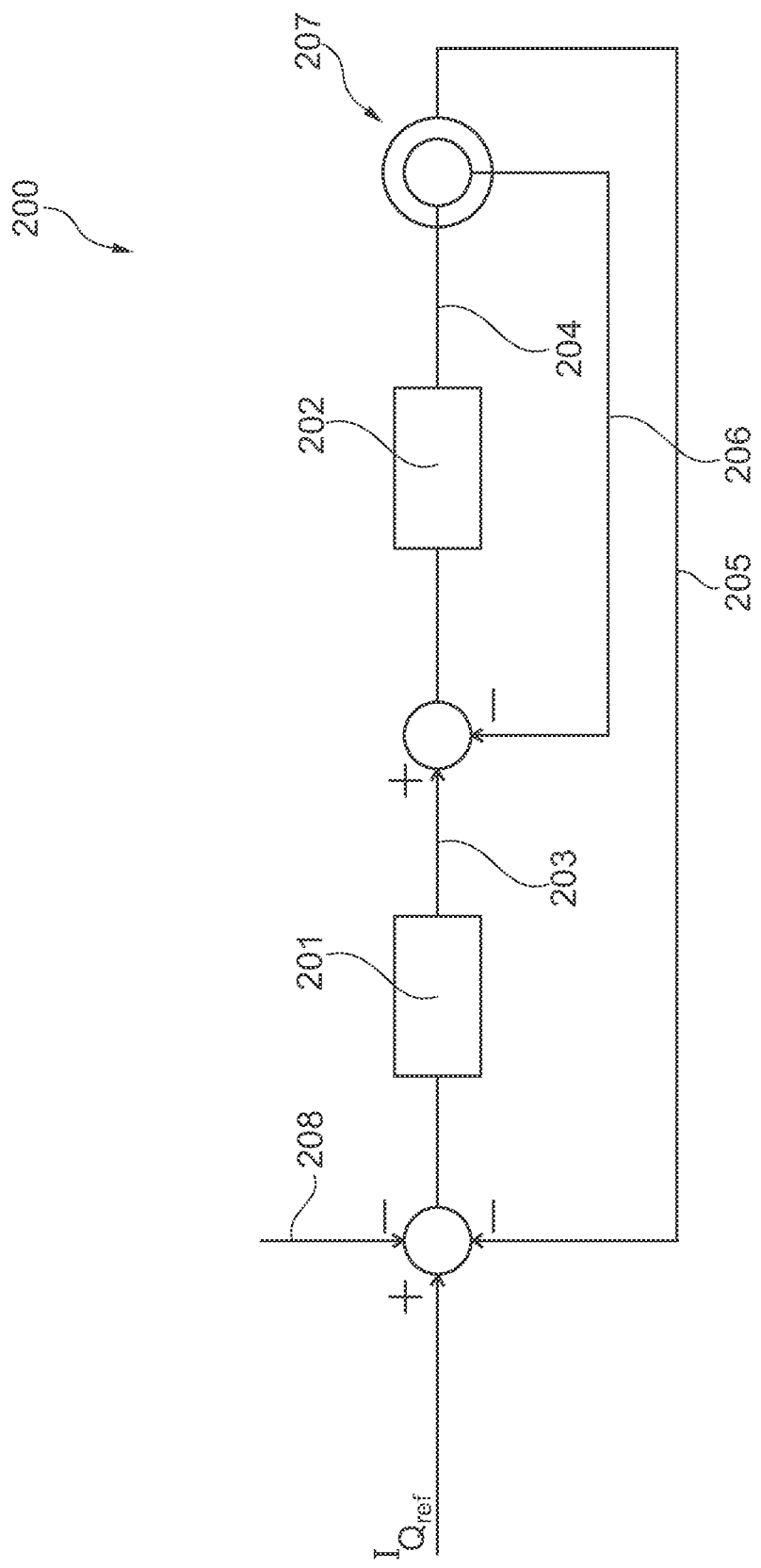
FIG. 2 shows a control loop for controlling a reactive current during an abnormal power grid event.

Referring now to FIG. 2 a closed control loop 200 is depicted. The closed control loop controls the d-axis rotor voltage 204 and whereby the reactive rotor current in response to a reactive current reference $I_{Qref}$ and two measured parameters 205, 206. As illustrated in FIG. 2 the reactive current reference is compared to a total reactive current 205 being provided by the stator and the grid-side inverter of the DFIG 207 and a grid breaker control signal 208. The grid breaker control signal 208 represents the overload capability of the grid breaker 116 in FIG. 1.

The difference between the reactive current reference, $I_{Qref}$, and the measured total reactive current 205 and grid breaker control signal 208 is provided to the regulator 201 which generates a reactive rotor reference 203. The reactive rotor reference 203 is compared to a measured reactive rotor current 206 and the difference between them is provided to the regulator 202 which generates the d-axis rotor voltage 204. The regulators 201, 202 may in principle be of any type, such as for example PI, PD or PID. Also, feedforward may be used so the PI only works on top of the feed-forward. This is not shown for simplification.

Thus, during the abnormal power grid event the DFIG 207 is controlled in a closed loop current configuration where the current reference $I_{Qref}$ and grid breaker control signal 208 are provided as input signals.

In the following an illustrative example of the advantages associated with embodiments of the present invention will be given. Obviously the various current levels depend on K-factor, size of voltage drop, active power reference, reactive power reference, generator speed etc.

In an illustrative example the stator may deliver 1600 A active current and 100 A reactive current to the power grid before the occurrence of an abnormal power grid event. The apparent stator current then equals 1603.12 A. In the following the rated current level of the grid breaker is assumed to be 200 A, whereas the overload capability of the grid breaker is assumed to be 280 A. In case of a 20% voltage drop and a K-factor of 2.5 the apparent stator current will reach 1978 A if the overload capability of the grid breaker is not used, i.e. the apparent current through the grid breaker may not exceed 200 A. If, on the other hand, the overload capability of the grid breaker is used to almost its maximum, i.e. 279.3 A, the apparent current to be delivered from the stator is reduced to 1688.08 A, i.e. a current reduction of almost 300 A.

Figure 3:
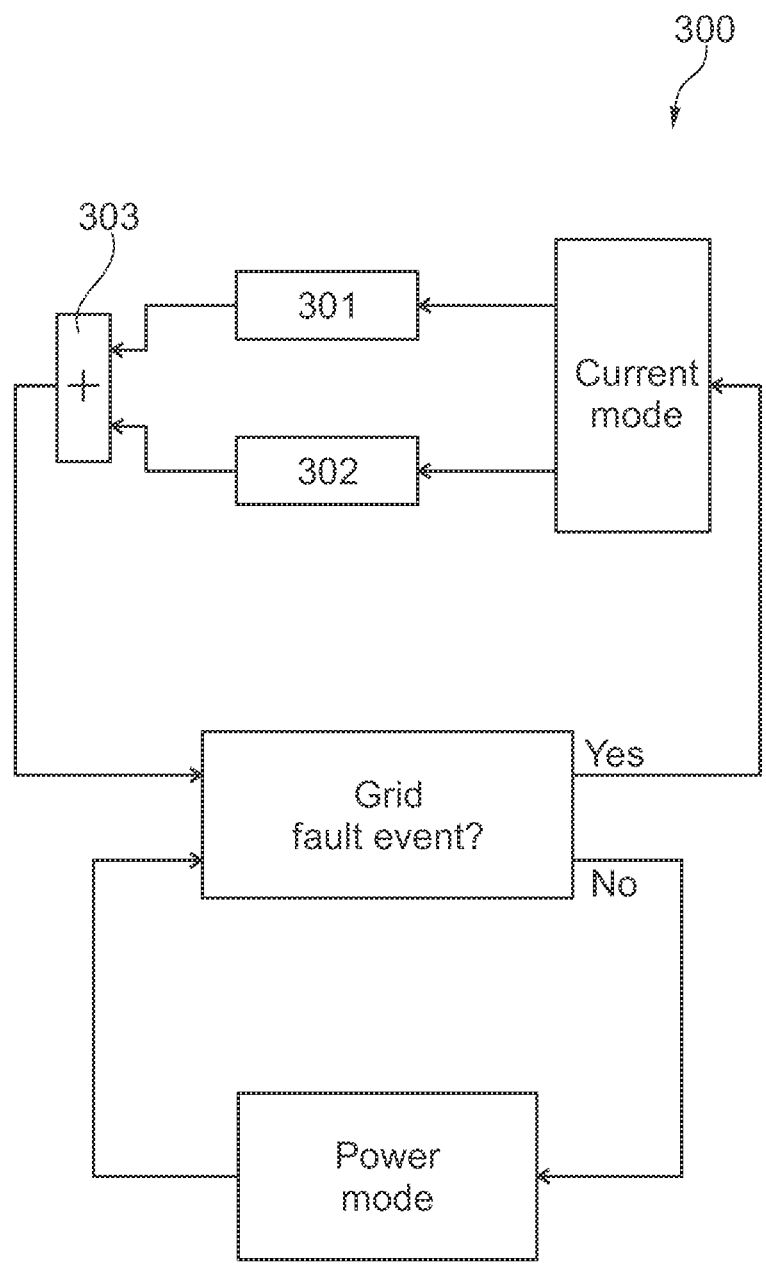
FIG. 3 shows a flow-chart illustrating the method according to the present invention.

In FIG. 3 a flow-chart 300 illustrating an embodiment of the method according to the present invention is depicted. As depicted in FIG. 3 if no abnormal power grid event is detected, i.e. if no grid fault is detected, the wind turbine generator is operated in a power mode. On the contrary, if an abnormal power grid event is detected the wind turbine generator is operated in a current mode. In the current mode the total reactive power to be delivered to the power grid is balanced between the stator of the DFIG and the grid-side inverter in a manner so that the current overload capability of a grid breaker is preferably used to its maximum, cf. the example given above. Thus, in the current mode the stator of the DFIG provides one portion of reactive current 301, whereas another portion of reactive current 302 is delivered by the grid-side inverter. The two portions of reactive power are summed 303 before being launched into the power grid. The reactive power from the stator of the DFIG is controlled via the d-axis rotor voltage 204, cf. FIG. 2, and the generated d-axis rotor voltage is 204 is provided to the DFIG as long as the abnormal power grid event is present.

The grid breaker may be able to handle more current in the initial phase of an abnormal power grid event. Thus, the reactive current contribution 302 from the grid-side inverter may have to be decreased during the abnormal power grid event in order not to trip the grid breaker. The decrease of reactive current may follow a substantial linear behaviour so that the reactive current through the grid breaker reaches a rated current level of the grid breaker after for example a few seconds or perhaps near the end of the abnormal power grid event. To compensate for the decrease of reactive current being provided through the grid breaker the reactive current being delivered by the stator of the DFIG can be increased accordingly.

The method illustrated in FIG. 3 may be implemented using variable means, such as a pure software implementation.

The invention claimed is:

1. A method for controlling an amount of reactive current provided from a wind turbine generator to a power grid during an abnormal power grid event, said wind turbine generator comprising a doubly-fed induction generator having a rotor and a stator, and a power converter coupling the rotor to the power grid, the power converter comprising a grid-side inverter, wherein the method comprises:
   increasing, during the abnormal power grid event, a reactive grid-side inverter current output by the grid-side inverter by a first amount by operating a grid breaker connected to the grid-side inverter above the grid breaker's rated current level; and
   reducing, during the abnormal power grid event, a stator current from the stator by a second amount based on the first amount.

2. The method according to claim 1, wherein the reactive grid-side inverter current is controlled in accordance with an overload reactive current capability of the grid breaker.

3. The method according to claim 1, wherein the abnormal power grid event involves a low-voltage ride-through event, an under-voltage ride-through event, an over-voltage ride through event or a high-voltage ride through event.

4. The method according to claim 1, wherein the stator current is kept below a predetermined upper stator current limit.

5. The method according to claim 4, wherein the stator current is kept below the predetermined upper stator current limit by keeping a reactive rotor current below a predetermined upper rotor current limit.

6. The method according to claim 1, wherein the amount of reactive current to be provided to the power grid equals a sum of the stator current and the reactive grid-side inverter current.

7. The method according to claim 1, wherein the reactive grid-side inverter current is controlled to exceed a rated current capacity of the grid breaker in at least part of a predetermined time period.

8. The method according to claim 7, wherein the reactive grid-side inverter current, at least during part of the predetermined time period, exceeds the rated current capacity of the grid breaker by at least 20%, such as at least 30%, such as at least 40%, such as at least 50%, such as at least 60%, such as at least 80%, such as at least 100%.

9. The method according to claim 7, wherein the reactive grid-side inverter current is controlled to decrease in a predetermined manner during at least part of the predetermined time period.

10. The method according to claim 9, wherein the grid-side inverter current decreases in a substantial linear manner.

11. A wind turbine generator arranged to deliver an amount of reactive current to a power grid during an abnormal power grid event, said wind turbine generator comprising:
a doubly-fed induction generator having a rotor and a stator;
a power converter coupling the rotor to the power grid, said power converter comprising a grid-side inverter; and
a controller configured to:
increase, during the abnormal power grid event, a reactive grid-side inverter current output by the grid-side inverter by a first amount by operating a grid breaker connected to the grid-side inverter above the grid breaker's rated current level; and
reduce, during the abnormal power grid event, a stator current from the stator by a second amount based on the first amount.

12. The wind turbine generator according to claim 11, wherein the controller is arranged to keep the stator current below a predetermined upper stator current limit.

13. The wind turbine generator according to claim 12, wherein the stator current is kept below the predetermined upper stator current limit by keeping a reactive rotor current below a predetermined upper rotor current limit.

14. The wind turbine generator according to claim 11, wherein the controller is arranged to keep the reactive grid-side inverter current above a rated current capacity of the grid breaker in at least part of a predetermined time period.

15. The wind turbine generator according to claim 14, wherein the controller is arranged to decrease the reactive grid-side inverter current in a predetermined manner during at least part of the predetermined time period.

16. A wind turbine generator arranged to deliver an amount of reactive current to a power grid during an abnormal power grid event, said wind turbine generator comprising:
a doubly-fed induction generator having a rotor and a stator;
a power converter coupling the rotor to the power grid, said power converter comprising a grid-side inverter; and
a controller configured to:
increase, during the abnormal power grid event, a reactive grid-side inverter current output by the grid-side inverter by a first amount by operating a grid breaker connected to the grid-side inverter above the grid breaker's rated current level;
reduce, during the abnormal power grid event, a stator current from the stator by a second amount based on the first amount;
keep the stator current below a predetermined upper stator current limit by keeping a reactive rotor current below a predetermined upper rotor current limit; and
keep the reactive grid-side inverter current above a rated current capacity of the grid breaker in at least part of a predetermined time period.

17. The wind turbine generator according to claim 16, wherein the controller is configured to decrease the reactive grid-side inverter current in a predetermined manner during at least part of the predetermined time period.

* * * * *